(12) United States Patent
Rogitz

(10) Patent No.: US 8,965,394 B2
(45) Date of Patent: Feb. 24, 2015

(54) DISABLING WIRELESS TELEPHONE USE WHILE IN VEHICLE

(75) Inventor: John L. Rogitz, Lakeside, CA (US)

(73) Assignee: John L. Rogitz, San Diego, CA (US)

( * ) Notice: Subject to any disclaimer, the term of this patent is extended or adjusted under 35 U.S.C. 154(b) by 1922 days.

(21) Appl. No.: 12/142,330

(22) Filed: Jun. 19, 2008

(65) Prior Publication Data

US 2009/0318169 A1   Dec. 24, 2009

(51) Int. Cl.
*H04W 64/00* (2009.01)
*H04M 11/00* (2006.01)
*H04W 68/00* (2009.01)
*H04M 1/725* (2006.01)
*H04W 4/02* (2009.01)

(52) U.S. Cl.
CPC ...... *H04M 1/72577* (2013.01); *H04M 1/72572* (2013.01); *H04M 2250/10* (2013.01); *H04W 4/027* (2013.01)
USPC ...................... 455/456.1; 455/421; 455/456.2

(58) Field of Classification Search
USPC ...................................................... 455/456.4
See application file for complete search history.

(56) References Cited

U.S. PATENT DOCUMENTS

| | | | |
|---|---|---|---|
| 6,496,703 B1 * | 12/2002 | da Silva | 455/456.4 |
| 6,600,975 B2 * | 7/2003 | Moriguchi et al. | 701/1 |
| 6,690,956 B2 | 2/2004 | Chua et al. | |
| 6,993,367 B2 | 1/2006 | Yamato et al. | |
| 7,236,776 B2 | 6/2007 | Nath et al. | |
| 7,359,714 B2 | 4/2008 | Parupudi et al. | |
| 7,460,866 B2 * | 12/2008 | Salkini et al. | 455/431 |
| 7,876,205 B2 | 1/2011 | Catten et al. | |
| 7,898,428 B2 | 3/2011 | Dietz et al. | |
| 8,000,689 B2 | 8/2011 | Featherstone et al. | |
| 8,295,854 B2 | 10/2012 | Osann, Jr. | |
| 8,311,517 B2 | 11/2012 | Brass et al. | |
| 8,401,589 B2 | 3/2013 | Liu et al. | |
| 2001/0044312 A1 * | 11/2001 | Yamane | 455/456 |
| 2002/0123329 A1 * | 9/2002 | Murray | 455/414 |
| 2002/0177928 A1 * | 11/2002 | Moriguchi et al. | 701/1 |
| 2002/0198005 A1 * | 12/2002 | Hilton et al. | 455/456 |
| 2004/0198332 A1 * | 10/2004 | Lundsgaard | 455/417 |
| 2005/0119002 A1 * | 6/2005 | Bauchot et al. | 455/441 |
| 2005/0119030 A1 * | 6/2005 | Bauchot et al. | 455/564 |
| 2005/0255874 A1 * | 11/2005 | Stewart-Baxter et al. | 455/550.1 |
| 2006/0148490 A1 * | 7/2006 | Bates et al. | 455/456.1 |
| 2006/0264168 A1 * | 11/2006 | Corbett et al. | 455/1 |
| 2007/0004413 A1 * | 1/2007 | Mahajan et al. | 455/441 |
| 2007/0026850 A1 * | 2/2007 | Keohane et al. | 455/418 |
| 2007/0072553 A1 * | 3/2007 | Barbera | 455/67.11 |
| 2007/0281603 A1 * | 12/2007 | Nath et al. | 455/1 |
| 2008/0064446 A1 * | 3/2008 | Camp et al. | 455/565 |

* cited by examiner

*Primary Examiner* — Lester Kincaid
*Assistant Examiner* — Andy Gu
(74) *Attorney, Agent, or Firm* — John L. Rogitz

(57) ABSTRACT

A method includes determining that a wireless telephone is in a moving vehicle using, e.g., speed as calculated by the telephone using GPS signals or co-location of the telephone with a vehicle as might be determined by receiving the vehicle's position via Bluetooth. Use of the telephone is selectively denied if it is determined that the telephone is in a vehicle.

18 Claims, 2 Drawing Sheets

DISABLING WIRELESS TELEPHONE USE WHILE IN VEHICLE

FIELD OF THE INVENTION

The present invention relates to disabling the use of a wireless telephone while the telephone is in a vehicle.

BACKGROUND OF THE INVENTION

Laws have been passed in the name of public safety to prohibit use of wireless telephones in vehicles by the drivers of the vehicles. These laws depend on user compliance and thus may be circumvented.

SUMMARY OF THE INVENTION

A method includes determining that a wireless telephone is in a moving vehicle, and selectively denying at least telephony service to the telephone in response to the determining act.

In some embodiments be determining act is executed by using successive position signals from the telephone over time to determine that a speed of the telephone exceeds a threshold. The determining act can be executed by the wireless telephone itself or by a telephony system communicating with the wireless telephone.

In non-limiting implementations the determining act is executed by using a position signal from the vehicle and a position vehicle from the telephone, and if the two position signals represent substantially the same location, determining that the telephone is in the vehicle. The denying act is executed by a wireless telephony system or by the telephone itself. The system may cause a busy signal to be returned to callers of the wireless telephone when it is determined that the telephone is in the vehicle.

If desired, if the telephone is determined to be in the vehicle, an audible and/or visual message is displayed on the wireless telephone indicating denial of service in response to a user of the wireless telephone attempting an outgoing call. If the telephone determines that the telephone is in the vehicle, use nonetheless can be enabled if the telephone receives an authorized use signal from, e.g., a sanctioned vehicle such as a police vehicle, train, etc.

In another aspect, a wireless telephone has a wireless telephony transceiver, a position receiver, and a processor communicating with the transceiver and receiver. A tangible computer storage medium is accessible to the processor and is programmed to cause the processor to determine if a speed as indicated by signals from the position receiver exceeds a threshold and if so, to disable at least some calls to and/or from the telephone.

In another aspect, a wireless telephone has a wireless telephony transceiver, a position receiver, and a processor communicating with the transceiver and receiver. A tangible computer storage medium is accessible to the processor and is programmed to cause the processor to determine if a position of the telephone as indicated by at least one signal from the position receiver substantially matches a position of a vehicle and if so, to disable at least some calls to and/or from the telephone.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
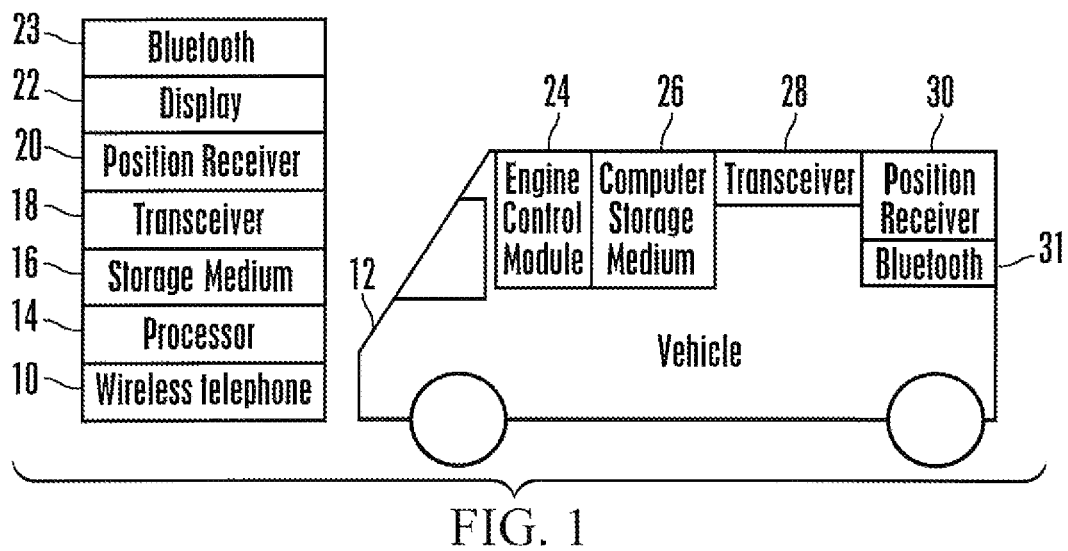
FIG. 1 is a block diagram of a wireless telephone and a vehicle.

FIG. 1 shows a wireless telephone 10 that can be carried by a user into a vehicle 12. The wireless telephone 10 includes a processor 14 that can access a tangible computer storage medium 16 such as but not limited disk-based storage or solid state storage. The processor 14 also communicates with a wireless telephony transceiver 18 such as but not limited a global systems for mobile communication (GSM) transceiver, a code division multiple access (CDMA) transceiver, variations and modifications thereof, as well as other types of wireless telephony transceivers including, without limitation, TDMA, FDMA, SDMA, wideband-CDMA, orthogonal frequency division multiplexing (OFDM), etc.

The processor 14 also communicates with a position receiver 20 such as a global positioning satellite (GPS) receiver to receive position information therefrom. If desired, in some embodiments the telephone 10 can include a short-range transceiver 23 such as but not limited to a Bluetooth transceiver.

The vehicle 12 may include a vehicle processor 24 such as an engine control module (ECM) accessing a tangible computer storage medium 26 such as but not limited disk-based storage or solid state storage. The vehicle processor 24 may also, in some embodiments, communicate with a wireless telephony transceiver 28 such as but not limited a global systems for mobile communication (GSM) transceiver, a code division multiple access (CDMA) transceiver, variations and modifications thereof as well as other types of wireless telephony transceivers including, without limitation, TDMA, FDMA, SDMA, wideband-CDMA, orthogonal frequency division multiplexing (OFDM), etc.

The vehicle processor 24 can also communicates with a position receiver 30 such as a global positioning satellite (GPS) receiver to receive position information therefrom. If desired, in some embodiments the vehicle 12 can include a short-range transceiver 31 such as but not limited to a Bluetooth transceiver.

Figure 2:
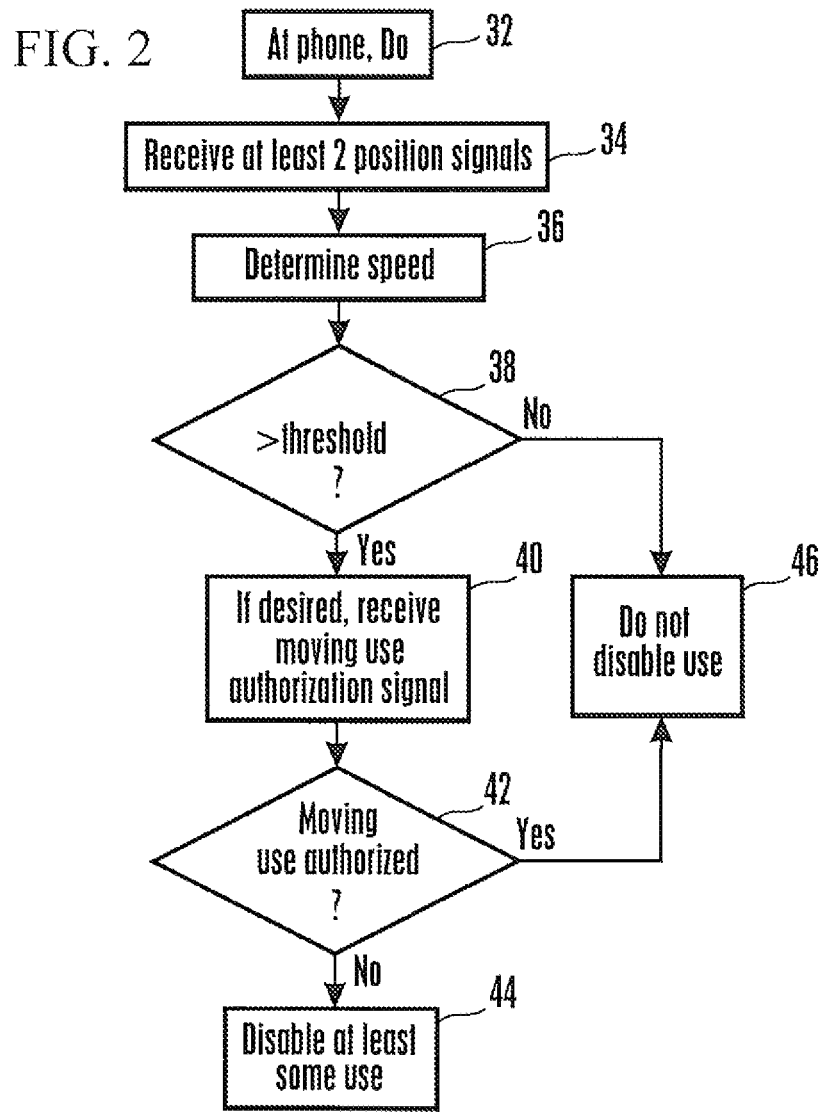
FIG. 2 is a flow chart of first example logic.

FIG. 2 shows logic that may be implemented by the telephone 12, relieving a telephony system infrastructure with which the telephone 12 communicates from executing the present logic and thus enhancing salability. It is to be understood that the logic of FIG. 12 may be programmed in the telephone storage medium 16 for all wireless telephones in a jurisdiction or for only some wireless telephones. For example, telephones used by police, emergency responders, and other sanctioned personnel may not include the logic of FIG. 2 (or may include the logic in a disabled state established by the telephone provider) and thus may not be constrained by the logic thereof.

At block 32, the process starts and moves to block 34 to receive two or more successive position signals from the position receiver 20. The position signals are used to determine speed at block 36 by calculating the distance between the positions indicated by the signal and dividing by the time between receipt of the signals.

At decision diamond 38 it is determined whether the calculated speed exceeds a threshold, indicating that the phone 10 is moving at a rate of speed associated with use in a moving vehicle. If the threshold is exceeded the logic optionally may move to block 40 to determine whether an authorized moving use signal, preferably an encrypted code programmed into the phone that can be periodically refreshed via, e.g., the telephony network, is received. By way of non-limiting embodiment, a police vehicle or a train or other sanctioned vehicle may be programmed to send, via, e.g., the short range transmitters 23, 31, a signal indicating to nearby telephones that use should be enabled. In this way, train use, for example, is permitted, as is use of a phone that has not been exempted as described above from the logic of FIG. 2.

Decision diamond 42 is executed if block 40 is provided to determine if authorized moving use exists. If not, the telephone is disabled at block 44 for at least some calls, e.g., for all non-911 calls. Or, all calls including 911 calls may be disabled. Disabling may be done programmatically by the telephone processor 14 by simply preventing outgoing or incoming calls from being processed, possibly accompanied by a suitable audible and/or visual disable informational message on the display 22. Or, the phone 10 may simply deenergize itself. Less desirably, disabling can be effected by sending a "disable" signal to the telephony network to cause the network to block calls to and from the phone in accordance with power transmission principles and/or other call-blocking principles known in the art.

If moving use is determined to be authorized at decision diamond 42 or if the speed threshold was not exceeded at decision diamond 38, use of the phone 10 is not disabled at state 46. The logic of FIG. 2 may be executed periodically, e.g., every thirty seconds or based on state, e.g., every time a position update is received, or based on other heuristics.

Figure 3:
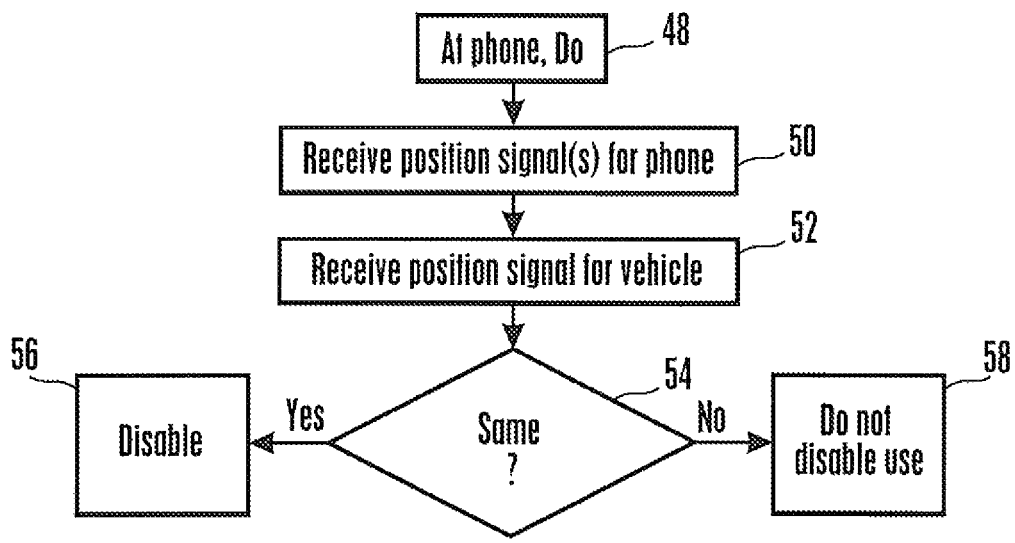
FIG. 3 is a flow chart of second example logic.

FIG. 3 shows alternate logic that may be executed without burdening the telephony system. At block 48 the telephone processor 14 begins and moves to block 50 to receive at least one position signal from the position receiver 20. At block 52 the phone 10 also receives, for example via the short range transmitters 23, 31, a position signal from a nearby vehicle as the vehicle might have received its position from, e.g., the vehicle position receiver 30. If the positions substantially match (e.g., within a threshold distance such as ten feet of each other) at decision diamond 54, use of the phone 10 is disabled at block 56. Otherwise, use is not disabled at block 58. The logic of FIG. 3 may be executed periodically or conditionally, e.g., upon receipt of a vehicle position signal over the short range transceiver 23.

Figure 4:
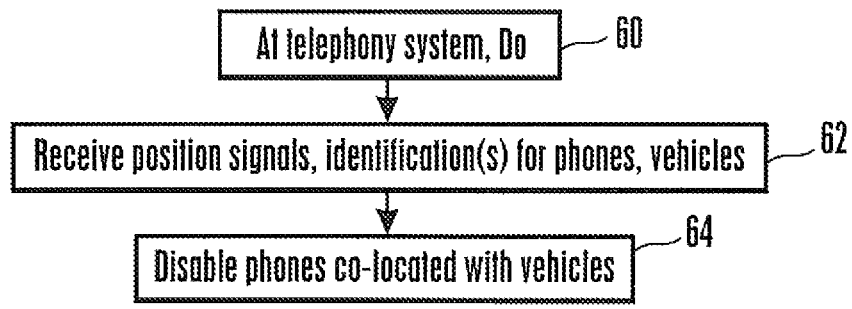
FIG. 4 is a flow chart of third example logic.

FIG. 4 shows that both the vehicle 12 and wireless phone 10 can be programmed according to, e.g., statute to periodically send position signals along with their identifications to a central database, which a telephony system commencing at block 60 can receive at block 62. Any phone except sanctioned phones discussed above that is determined to be co-located with a vehicle (except with a sanctioned vehicle) can be disabled at block 64 by, e.g., blocking incoming and outgoing calls, with exceptions such as for 911 calls if desired.

In still further alternate embodiments, the logic of FIG. 2 may be executed by the telephony system, e.g., the phone 10 can send its position to the system and a system server can determine speed from successive positions, inferring use in a moving vehicle. In yet another alternate embodiment in which the telephony system is recruited to prevent unauthorized moving use of wireless phones, trains can send their GPS coordinates to the telephony system to permit phone use in trains when the two positions (trains and phone) match.

While the particular DISABLING WIRELESS TELEPHONE USE WHILE IN VEHICLE is herein shown and described in detail, it is to be understood that the subject matter which is encompassed by the present invention is limited only by the claims. For instance, instead of disabling itself when its speed exceeds the threshold, the phone may emit loud beeps to alert the user of possible unauthorized use while driving, and/or it may automatically send a report of exceeding the threshold to a central server along with its position and time, and the server can then be accessed by law enforcement personnel to send warning letters to offenders, or even to send citations to the users for unauthorized use.

What is claimed is:

1. A method comprising:
   determining that a wireless telephone is in a moving vehicle;
   receiving a first position signal from the vehicle, wherein the first position signal is received from the vehicle or a position receiver installed on the vehicle;
   receiving a second position signal from the wireless telephone;
   determining whether the first and second position signals represent substantially the same location;
   determining whether a speed is greater than a threshold, wherein the speed is determined based on at least one of the first position signal or the second position signal; and
   selectively denying at least some telephony service to the telephone responsive to a determination that the first and second position signals represent substantially the same location and that the speed is greater than the threshold.

2. Method of claim 1, wherein the determining act is executed by using successive position signals from the telephone over time to determine that a speed of the telephone exceeds a threshold.

3. Method of claim 1, wherein the determining act is executed by the wireless telephone.

4. Method of claim 1, wherein the determining act is executed by a telephony system communicating with the wireless telephone.

5. Method of claim 1, wherein the denying act is executed by a wireless telephony system.

6. Method of claim 5, wherein the system causes a busy signal to be returned to callers of the wireless telephone when it is determined that the telephone is in the vehicle.

7. Method of claim 1, wherein responsive to a determination that the telephone is in the vehicle, an audible and/or visual message is displayed on the wireless telephone indicating denial of service in response to a user of the wireless telephone attempting an outgoing call.

8. Method of claim 3, wherein responsive to a determination that the telephone is in the vehicle, use is enabled if the telephone receives an authorized use signal.

9. A wireless telephone, comprising:
   a wireless telephony transceiver;
   a position receiver configured to receive a first position signal corresponding to the position of the wireless telephone;
   a short-range transceiver configured to receive a second position signal corresponding to the position of a vehicle, wherein the second position signal is received from the vehicle or a position receiver installed on the vehicle;
   a processor communicating with the wireless telephony transceiver, the short-range transceiver and the position receiver; and
   a tangible computer storage medium accessible to the processor and bearing logic to cause the processor
   to determine whether the two position signals represent substantially the same location,
   to determine whether a speed as indicated by signals from the position receiver exceeds a threshold, and,
   in response to a determination that a speed as indicated by signals from the position receiver exceeds a threshold, to cause the telephone to automatically send a report thereof to a central server separate from the telephone and accessible to law enforcement.

10. The telephone of claim 9, wherein responsive to a determination that the speed exceeds the threshold, the processor disables at least some calls to and/or from the telephone.

11. The telephone of claim 10, wherein the processor does not disable calls responsive to a determination that the threshold is exceeded under a condition that the processor receives a moving use authorized signal.

12. The telephone of claim 11, comprising a short range transceiver for receiving the moving use authorized signal.

13. A storage device for controlling a wireless telephone, comprising:
   a computer storage medium that is not a transitory signal and that includes instructions executable by a processor to configure the processor to:
   receive a first position signal from the vehicle, wherein the first position signal is received from the vehicle or a position receiver installed on the vehicle;
   receive a second position signal from a position receiver of the wireless telephone;
   determine whether the position corresponding to the second position signal substantially matches the position of the automotive vehicle,
   determine whether a speed is greater than a threshold, wherein the speed is determined based on at least two position signals from the position receiver of the wireless telephone or two position signals from a position receiver of the automotive vehicle, and
   disable at least some calls to and/or from the telephone responsive to a determination that the first and second position signals represent substantially the same location and that the speed is greater than the threshold.

14. The telephone of claim 13, wherein responsive to a determination that the speed exceeds the threshold, the processor disables at least some calls to and/or from the telephone.

15. The telephone of claim 14, wherein the processor does not disable calls responsive to a determination that the positions substantially match under a condition in which the processor receives a moving use authorized signal.

16. The telephone of claim 15, comprising a short range transceiver for receiving the moving use authorized signal.

17. The telephone of claim 16, comprising a short range transceiver for receiving the position of a vehicle.

18. The telephone of claim 13, wherein responsive to a determination that the speed exceeds the threshold, the telephone automatically sends a report thereof.

* * * * *